3,281,394
PYROLYZED PHTHALALDEHYDE
John E. Katon, Dayton, Ohio, assignor to Monsanto Company, a corporation of Delaware
Filed Feb. 25, 1963, Ser. No. 260,784
12 Claims. (Cl. 260—67)

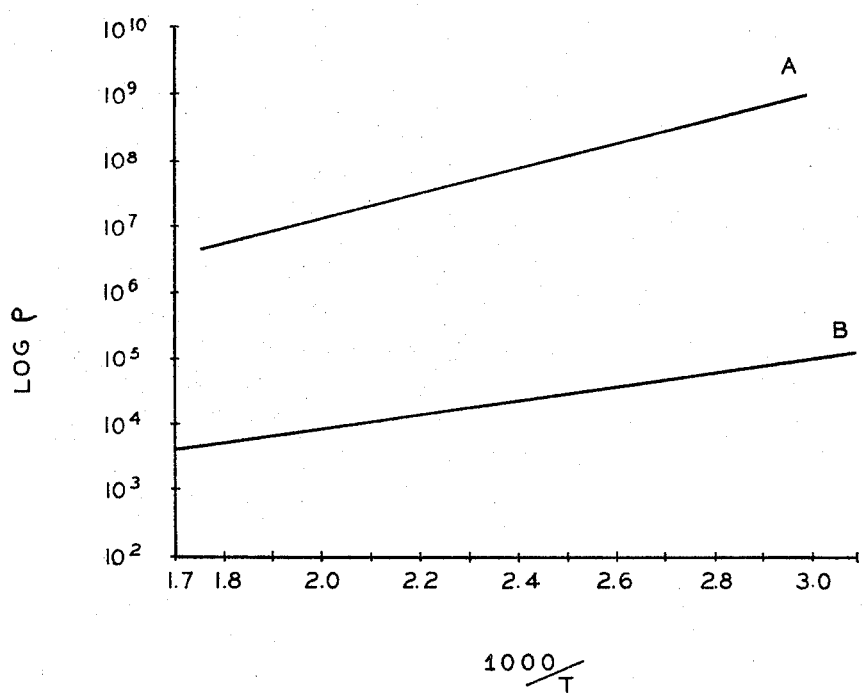

This invention relates to new and useful compositions of matter and to the process for preparing them. More specifically this invention relates to the reaction product obtained by pyrolysis of a phthalaldehyde and the process so utilized.

The semiconductive properties of organic polymers comprise a promising area of interest which has been somewhat overlooked until recently. However the general motivation which has stimulated research in the field of organic conductors, that is the possibility of tailoring organic molecules to meet any specific requirement of the electronics industry regarding semiconductor devices, is at least as applicable to polymeric organic compounds as to monomeric organic materials. In addition, polymeric aromatic materials provide an abundant source of $\pi$-electrons; and this is significant since $\pi$-electron transfer is one of the theories advanced to explain conduction in organic systems. Recognition of this possibility has led to intensive research directed toward discovering and developing organic polymers with suitable semiconductive properties. The compounds and process described herein are a result of my efforts in this field.

It is therefore an object of this invention to provide certain organic polymers as novel compositions of matter.

It is a further object of this invention to provide a novel process for the production of these organic polymers.

It is a further object of this invention to provide compositions of matter useful in the manufacture of semiconductors.

Additional objects, benefits, and advantages will become apparent from the following detailed description of the invention and the accompanying drawing, which is a graph showing the temperature-resistivity curves of some of the compounds of this invention.

Broadly, the compounds of this invention are prepared by the pyrolysis of a phthalaldehyde. The exact structural configuration of the reaction product is not known. Properties of the reaction products suggest the presence of a polyphenyl grouping. However, carbon-hydrogen analyses of the reaction product indicate the presence of a third element in the products. This third elemental component is quite likely oxygen, present in the form of aldehydic or ketonic groups. The inadvisability of suggesting a definite structure for these compounds arises from the fact that accurate and meaningful analyses of these pyrolyzed materials are difficult to obtain.

A more exact manner, therefore, of describing these compounds is in terms of their physical and electrical properties. The compounds are hard black solids, insoluble in water, alcohol, benzene, and acetone, and unsublimable when heated at 300° C. and 0.1 mm. The most significant electrical property of the compounds of this invention is the temperature-resistivity relationship. To determine this relationship, resistances of the compounds are measured at various temperatures and resistivities calculated according to the procedure subsequently described in Example V. In general, the compounds herein described are characterized by resistivities of $10^3$ to $10^{10}$ ohm-cm. at 40° C. and $10^1$ to $10^8$ ohm-cm. at 320° C. Other pyrolyzed phthalaldehydes having resistivities falling outside the above range are nevertheless included within the scope of this invention if they have a resistivity at 40° C. not greater than $10^{10}$ ohm-cm.

The compounds of this invention are prepared by the pyrolysis of phthalaldehyde at a minimum temperature of 300° C. A range of pyrolysis temperatures which yields products most useful as components in semiconductor devices is 400° C. to 1200° C., a more preferred range being 400–700° C. The pyrolysis should be carried out in a closed vessel to prevent loss of the phthalaldehyde through sublimation. For pyrolyses carried out at 500° C. or below it is not necessary to exclude oxygen, but for pyrolyses conducted at temperatures of 500° C. or above, it may be advisable to exclude oxygen by evacuation or purging with inert gas to prevent excessive oxidation from materially affecting the reaction product. This exclusion of oxygen may be particularly important at pyrolysis temperatures above 700° C. The pressure on the system is not an important factor insofar as the reaction is concerned and may vary from a few tenths of a millimeter absolute pressure to several atmospheres. However if a pressurized pyrolysis is desired, the reactor vessel should preferably be pressurized with some inert gas such as helium or nitrogen and preferably should not contain an appreciable amount of oxygen. The length of time required for complete reaction is influenced by the other variables of temperature and pressure and by the type of properties desired in the product, such as N or P type conductivity; thermoelectric and photoelectric properties, etc., and cannot be independently set forth with meaningful limitations. When pyrolyzing around 500° C., I have carried out the pyrolysis for about 16 hours and have found this length of time to be adequate to produce compositions having desirable properties. Of course it is possible to adopt shorter or longer times for pyrolysis with equal, or nearly equal, success. In carrying out the pyrolysis, the reactor vessel should preferably consist of, or be lined with, a material which will remain unreactive with the reaction mixture at the elevated temperatures of this reaction.

Following pyrolysis, a hard black material is left as a residue. To move impurities, it is advisable to grind the product to a fine powder and extract it continuously for several hours in a Soxhlet extractor or similar apparatus using ethanol, acetone, benzene, or some other suitable organic solvent. Overnight extraction is suggested although an extraction of one hour or less may be sufficient for most cases. This treatment removes lower molecular weight compounds and other impurities by dissolving them in the extractant, thereby leaving a more uniform pyrolyzed phthalaldehyde product as a residue.

Additional purification of the polymer reaction product is advisable following extraction to remove lower molecular weight polymer insoluble in the extracting solvent. This may be accomplished by subjecting the product to elevated temperatures and reduced pressure to cause a sublimation of impurities. Temperatures of 300–350° C. combined with absolute pressures of 0.1–0.5 mm. Hg are adequate, but various other combinations of temperature and pressure are also possible. Generally, with higher temperatures, less vacuum is required. However, sublimation temperatures should be lower than the temperature of pyrolysis, preferably at least 100° C. lower. The unsublimed residue is the purified reaction product.

The extraction and sublimation procedures described above do not necessarily provide a product with superior semiconductive properties since the presence of certain impurities in the product may actually improve its electrical characteristics for some applications. But these purification techniques, or some equivalent technique, do aid in the preparation of a more uniform and stable product than can be prepared by pyrolysis alone.

The invention will be more clearly understood from the detailed description set forth in the following examples when read in conjunction with the accompanying drawing.

EXAMPLE I

A quantity of 10 grams of terephthalaldehyde was placed in a glass-lined bomb. The bomb was sealed and heated at 420° C. for 16.5 hours. The material obtained was a hard black solid. A small amount of white solid was also present. The mixture was placed in a Soxhlet extractor and extracted with benzene for 24 hours. The residual material was removed, dried, and ground to a fine powder. The white material was still present. Weight of the crude product at this point was 5.8 grams. This material was then heated to 300° C. at 0.2 mm. absolute pressure for one hour. A white solid sublimed. Weight of the purified product, which was a fine black powder, was 4.9 grams. Analysis of carbon-hydrogen content gave 92.87 and 92.80% C, 4.40 and 4.62% H.

EXAMPLE II

A quantity of 10 grams of terephthalaldehyde was placed in a 300 ml. glass-lined bomb. The bomb was sealed and heated in a furnace at 500° C. for 16 hours. The material obtained was a hard black solid. Upon removal from the bomb, the material was placed in a Soxhlet extractor and extracted with acetone for about 16 hours. The acetone acquired a pale yellow color. The material was removed, dried, and ground to a fine powder. This powder was then heated at 300–320° C. and 0.3–0.5 mm. absolute pressure for one hour. Weight of the purified product, which was a black powder, was 5.2 grams. Analysis of carbon-hydrogen content gave 95.26 and 95.00% C, 3.27 and 3.00% H.

EXAMPLE III

A quantity of 10 grams of o-phthalaldehyde is placed in a quartz-lined bomb, evacuated, pressured to one atmosphere with nitrogen, and heated in a furnace at 600° C. for 16 hours. The resulting black solid is extracted, ground and sublimed according to the procedure described in Example II. The unsublimed black powder is the desired product.

EXAMPLE IV

A quantity of 10 grams of m-phthalaldehyde is placed in a quartz-lined bomb. The bomb is sealed and heated in a furnace at 500° C. for 16 hours. The resulting black solid is extracted, ground, and sublimed according to the procedure described in Example II. The unsublimed black powder is the desired product.

EXAMPLE V

This example describes the determination of electrical properties of the phthalaldehyde pyrolysis reaction products. Data obtained is plotted in graph form in the accompanying figure, curves A and B representing data pertaining to the products of Examples 1 and 2, respectively.

The material was tested in powdered form as follows: the test cell for the electrical measurement is a tubular quartz cylinder with a ¾" internal diameter. This cylinder is placed upright on a platinum plate, thereby sealing off the bottom of the cylinder. The powdered sample to be tested is added to the quartz cylinder to a depth of 1 or 2 millimeters. A platinum slug is inserted at the top of the quartz cylinder and a pressure of 900 grams/sq. cm. is applied to the powdered sample through the slug. The sample is heated by conduction through the platinum plate to a temperature of about 280° C. under a vacuum of about $10^{-3}$ mm. of Hg for at least 16 hours. Following this treatment, the sample is subjected to a series of treatments, involving evacuation under high vacuum, purging with nitrogen, evacuation under high vacuum, and finally subjection to a nitrogen atmosphere of 5 inches of Hg absolute pressure in preparation for the electrical testing. During the electrical testing, the pressure of 900 g./sq. cm. is maintained on the powdered sample as described above. As previously indicated, the heating of the samples is accomplished by conduction through the platinum plate upon which the quartz cylinder and the powdered sample rests. The curves in the accompanying drawing are both cooling curves, i.e. the measurements are made beginning at the high temperature with successive measurements being taken as the sample cools down. The electrical resistance measurements are made across the thickness of the sample via the platinum plate and the platinum slug. From these resistance measurements, the resistivities are calculated and plotted in the accompanying figure as the logarithm of the resistivity versus the reciprocal of the absolute temperature in degrees Kelvin times 1000. Table I below gives the resistivity values of two reaction products at the temperature extremes of the measurement.

TABLE I

| Compound | Temp. Range, ° C. | Resistivity at temp. extremes (ohm-cm.) |
|---|---|---|
| Reaction product of Example I (420° C. pyrolysis of terephthalaldehyde) | 40–280 | $10^9$–$4 \times 10^6$ |
| Reaction product of Example II (500° C. pyrolysis of terephthalaldehyde) | 50–320 | $7 \times 10^4$–$4 \times 10^3$ |

Inspection of the data presented shows that the compounds of this invention possess semiconductive properties which make them useful as components in such devices as diodes, power rectifiers, transistors, thermistors, etc.

Pyrolysis of the phthalaldehyde is of course necessary to prepare compounds having the utility mentioned above since unpyrolyzed phthalaldehyde is recognized as an insulator by those skilled in the art.

Although the invention has been described in terms of specified embodiments which are set forth in considerable detail, it should be understood that this was done for illustrative purposes only, and that the invention is not necessarily limited thereto since alternative embodiments and operating techniques will become apparent to those skilled in the art in view of this disclosure. For instance, it may be possible to utilize a catalyst in the pyrolysis reaction, thereby obtaining the compounds of this invention by pyrolysis at lower temperatures or in less time than disclosed herein. Accordingly, these and other modifications are contemplated which can be made without departing from the spirit of the described invention.

What is claimed is:

1. Pyrolyzed phthalaldehyde characterized by a resistivity of from $10^3$ to $10^{10}$ ohm-cm. at 40° C. and $10^1$ to $10^8$ ohm-cm. at 320° C.

2. Pyrolyzed terephthalaldehyde which possesses a resistivity at 40° C. not greater than $10^{10}$ ohm-cm.

3. Pyrolyzed terephthalaldehyde characterized by a resistivity of from $10^3$ to $10^{10}$ ohm-cm. at 40° C. and $10^1$ to $10^8$ ohm-cm. at 320° C.

4. Pyrolyzed terephthalaldehyde which possesses a resistivity at 40° C. not greater than $10^{10}$ ohm-cm.

5. A process for pyrolyzing phthalaldehyde which comprises heating the phthalaldehyde in a closed vessel at a minimum temperature of 300° C. for a time sufficient to achieve substantial reaction, and thereby producing a material having a resistivity of not more than $10^{10}$ ohm-cm. at 40° C.

6. A process according to claim 5 wherein the phthalaldehyde is heated at a temperature between 400°–1200° C.

7. A process according to claim 5 wherein the phthalaldehyde is heated at a temperature between 400°–700° C.

8. Black pyrolyzed phthalaldehyde having from about 92.8 to about 95.3% by weight carbon and from about 4.6 to about 3.0% by weight hydrogen and further characterized by a maximum resistivity at 40° C. of $10^{10}$ ohm-cm.

9. Black pyrolyzed phthalaldehyde having from about 92.8 to about 95.3% by weight carbon and from about 4.6 to about 3.0% by weight hydrogen, said pyrolyzed phthalaldehyde being insoluble in water, alcohol, benzene, and acetone, and unsublimable when heated at 300° C. and 0.1 mm. and further characterized by a maximum resistivity at 40° C. of $10^{10}$ ohm-cm.

10. Black pyrolyzed terephthalaldehyde having from about 92.8 to about 95.3% by weight carbon and from about 4.6 to about 3.0% by weight hydrogen and further characterized by a maximum resistivity at 40° C. of $10^{10}$ ohm-cm.

11. Black pyrolyzed terephthalaldehyde having from about 92.8 to about 95.3% by weight carbon and from about 4.6 to about 3.0% by weight hydrogen, said pyrolyzed terephthalaldehyde being insoluble in water, alcohol, benzene and acetone, and unsublimable when heated at 300° C. and 0.1 mm. and further characterized by a maximum resistivity at 40° C. of $10^{10}$ ohm-cm.

12. A process for pyrolyzing phthalaldehyde comprising heating phthalaldehyde in a closed vessel at a temperature between 400° and 700° C. for about 16 hours to produce a material having a maximum resistivity of $10^{10}$ ohm-cm. at 40° C.

References Cited by the Examiner
UNITED STATES PATENTS

| | | | |
|---|---|---|---|
| 2,349,979 | 5/1944 | Moldenhauer et al. | 260—67 |
| 3,124,559 | 3/1964 | De Witt | 260—67 |

OTHER REFERENCES

Lenz et al.: Journal of Organic Chemistry, vol. 25 (May 1960), pages 813–817.

WILLIAM H. SHORT, *Primary Examiner.*

L. M. MILLER, *Assistant Examiner.*